United States Patent [19]
Lindeboom

[11] 3,759,532
[45] Sept. 18, 1973

[54] FLUID SEAL
[75] Inventor: Herman Lindeboom, Pennington, N.J.
[73] Assignee: Ingersoll-Rand Company, New York, N.Y.
[22] Filed: June 9, 1972
[21] Appl. No.: 261,343

Related U.S. Application Data
[63] Continuation of Ser. No. 21,163, March 19, 1970, abandoned.

[52] U.S. Cl.......................... 277/27, 277/74, 277/75
[51] Int. Cl.......................... F16j 15/40, F16j 15/54
[58] Field of Search .................. 277/27, 73, 74, 75, 277/3

[56] References Cited
UNITED STATES PATENTS
3,033,577  5/1962  Spiess ..................................... 277/3
3,315,968  4/1967  Hanlon ................................... 277/3
3,410,565  11/1968  Williams ............................... 277/3
3,572,727  3/1971  Greiner............................. 277/75 X Primary Examiner—Samuel B. Rothberg
Attorney—Frank S. Troidl et al.

[57] ABSTRACT

An improved fluid seal is disclosed which may be used equally effectively for either a straight leakoff seal or an injection seal. A differential pressure is maintained in the space between a first sealing member such as a collar on a rotatable shaft and an axially movable second seal member. A plurality of passageways which are equally spaced radially from the axis of the second seal member and equally spaced circumferentially interconnect the space between the two seal members and an external fluid pressure. The new seal may be used for sealing gas or liquid.

5 Claims, 9 Drawing Figures

INVENTOR
HERMAN LINDEBOOM
BY
Frank S. Troidl
ATTORNEY

INVENTOR
HERMAN LINDEBOOM

BY

*Frank S. Troidl*

ATTORNEY

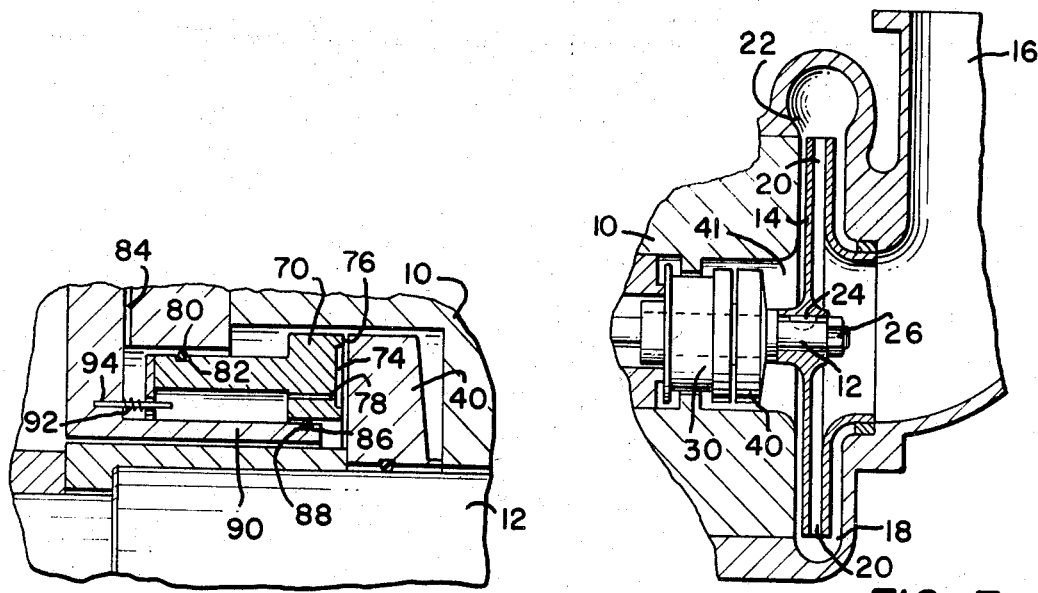
FIG. 9
FIG. 7
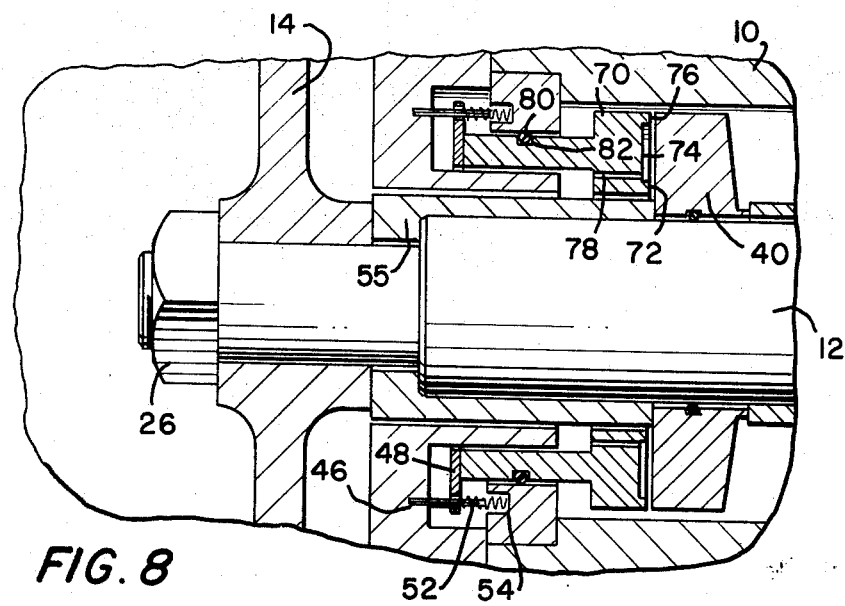
FIG. 8
INVENTOR
HERMAN LINDEBOOM
BY
Frank S. Troidl
ATTORNEY

FLUID SEAL

This is a continuation of application Ser. No. 21,163, filed Mar. 19, 1970, and now abandoned.

This invention relates to fluid seals. More particularly, this invention is a new and improved fluid seal for use with either a gas or liquid system wherein the seal members are kept slightly separated. This new seal member may be used as a straight leakoff seal or an injection seal.

In one type of currently used seal, called a leakoff seal, the medium to be sealed flows through the clearance formed by the separation of the seal members. The mating face of one of the seals includes a recessed portion. The shape of the mating face is such that the space between the two seals adjacent such recessed portion is "restrictive"—i.e., a differential pressure is created. Te mating face may also include sealing dams. In such case, the spaces between the two seals adjacent the sealing dams are more restrictive than the space adjacent the recessed portion. The total differential pressure across the space between the two seals controls the pressure profile across the seal faces and will determine the operating clearance.

In another type of currently used seal, called an injection seal, an injection fluid is flowed into the housing and to the atmosphere in addition to the fluid to be sealed. The injection fluid flows through a hole and an inherent restrictor in one of the seal members. The mating face of this seal member also includes a recessed portion. The operating clearance between the seals is controlled by the differential pressure through the inherent restrictor.

My new seal may be used either as a straight leakoff seal or an injection seal. The advantage of such a seal is obvious. When used as a leakoff seal, the invention is used in combination with a seal housing having means for subjecting the inside of the housing to the pressure of the fluid to be sealed. When used as an injection seal, the housing also has a fluid inlet for the injection fluid.

Briefly, an axially movable seal member is mounted within the housing and kept slightly separated from another movable seal member so as to maintain a slight gap between the two seal members. Te axially movable seal member is provided with a mating face and a rear face. A secondary sealing member is so located between the inside of the housing and this seal member that at least a portion of the rear face is subjected to external fluid pressure. Two dams are provided on the mating face of the seal member, thus providing a recessed portion between the dams. A plurality of fluid passageways are provided through the seal member and connect the space adjacent the recessed portion to the external fluid pressure.

When the seal is used as an injection seal, two secondary sealing members are located within the housing and between the inside of the housing and the second sealing member. The two secondary sealing members are located to separate the injection pressure from the external system pressure except through the passageways in the axially movable sealing member.

Though described herein as being applied to rotating equipment, the new seal can also be used with reciprocating equipment or any other type of equipment for sealing fluids, both liquids and gases.

The invention, as well as its many advantages, may be further understood by reference to the following detailed description and drawings in which:

FIG. 7 is a fragmentary elevational view, partly in section, showing the use of my new seal in a pump;

FIG. 8 is a side elevational view, partly in section, showing a modification of my new seal used as a straight leakoff seal; and FIG. 9 is a side elevational view, partly in section, illustrating the use of the seal of FIG. 8 as an injection seal.

Like parts throughout the various views are referred to by like numbers.

Figure 1:
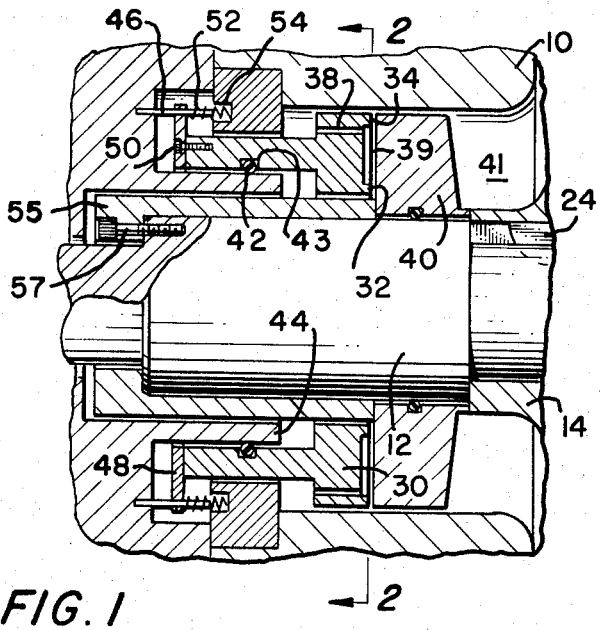
FIG. 1 is an elevational view, partly in section, showing the use of my new invention as a leak-off seal.
Figure 2:
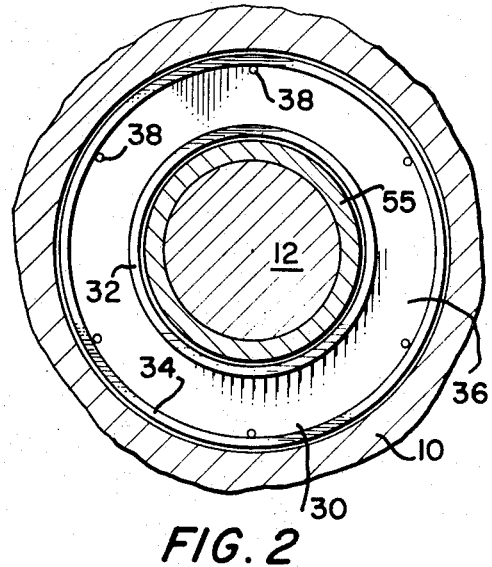
FIG. 2 is a view taken along the lines 2—2 of FIG. 1.

Referring to the drawings and particularly to FIG. 1 and FIG. 7, my new seal is illustrated as used as a straight leakoff seal in a fluid pump. A housing 10 is shown in which is installed a drive shaft 12. Assembled on the rotatable shaft 12 is an impeller 14 (see FIG. 7). An intake throat or conduit 16 is formed on housing 10 and opens coaxially into the side of the impeller chamber 18. Impeller 14 mounted within impeller chamber 18 has formed therein a plurality of spoke-like, radially extending passages 20 which open axially at their inner ends to intake conduit 16, and open radially at their outer ends to the discharge chamber 22, as is common in centrifugal pumps of this type.

A long key 24 drivingly connects impeller 14 to the shaft, and a nut 26, threaded on the end of the shaft, clamps the impeller axially to the shaft.

Figure 3:
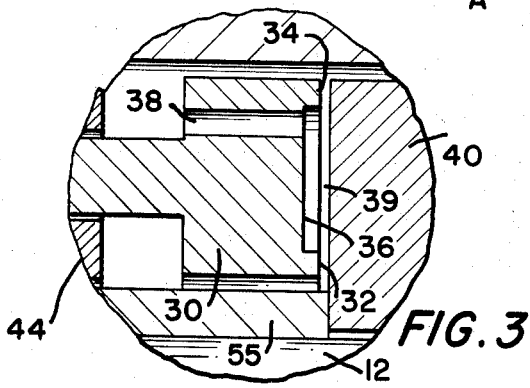
FIG. 3 is a fragmentary view on an enlarged scale, partly in section, showing the structure of the axially movable sealing member.

In accordance with my invention, a sealing ring 30 having a special shape and special dimensions is mounted within housing 10. The mating face of sealing ring 30 is provided with an inner annular dam 32 (see FIG. 3) and an outer annular dam 34, thus providing an annular recess 36 separting the inner and outer dams.

A plurality of fluid passageways 38 extend from the rear face of sealing ring 30 to the space 39 between the sealing ring and the collar 40 adjacent annular recess 36. Thus, external fluid entering the housing through fluid inlet 41 may flow through passageways 38 to the space separating sealing ring 30 and collar 40. Passageways 38 are preferably located just below outer annular dam 34 and are preferably each located the same radial distance from the axis of the sealing ring and equally spaced circumferentially.

An improtant feature of this new sealing ring is that the shape of passageways 38 is such that there is little or no pressure drop in each passageway. Passageways 38 are unrestricted. Thus, the pressure is substantially equal on opposite sides of passageways 38. The shapes of annular dams 32 and 34 and the maintained spacing between collar 40 and sealing ring 30 are such that a differential pressure exists in space 39 adjacent passageways 38, and a differential pressure also exists across recess 36 and across each of dams 32 and 34. The differential pressure in space 39 adjacent passageways 38 is determined by the pressure profile for hydrostatic equilibrium on the mating face of seal 30 between passageways 38 and the pressure profile for hydrostatic equilibrium on the mating face of seal 30 across passageways 38. Since passageways 38 are unrestricted, the pressure on the mating face of seal 30 across the passageways is substantially equal to the pressure on the opposite sides of the passageways.

An O-ring 42 located in the recess 43 provides a secondary seal between an inwardly extending annular member 44 of housing 10 and sealing ring 30. The dowel pins 46 extend through the washer 48, which, in turn, is connected to sealing ring 30 by the threaded screws 50. The coil springs 52 positioned within the recesses 54 of housing 10 fit about one end of dowel pins 46 and operate against washer 48 to provide a normally open seal. If desired, the structure could be easily modified, for example, by placing the coil springs about the opposite ends of the dowel pins to provide a normally closed seal.

The biasing force of coil springs 52 is just enough to overcome the friction of O-ring 42 at zero pressure differential. The mating face area of sealing ring 30 and the rear face area of the sealing ring are such that under pressure the balance of pressure forces acting on the mating face and the rear face of the sealing ring keeps a positive clearance between collar 30 and sealing ring 30. A small amount of the fluid to be sealed flows inwardly between the sealing faces of collar 40 and sealing ring 30 from the high-pressure region, which, in FIG. 1, is the region on the outer edge of sealing ring 30 to the low-pressure region between the seal spacer 55 connected to shaft 12 by the screws 57 and the inner edge of sealing ring 30.

Figure 4:
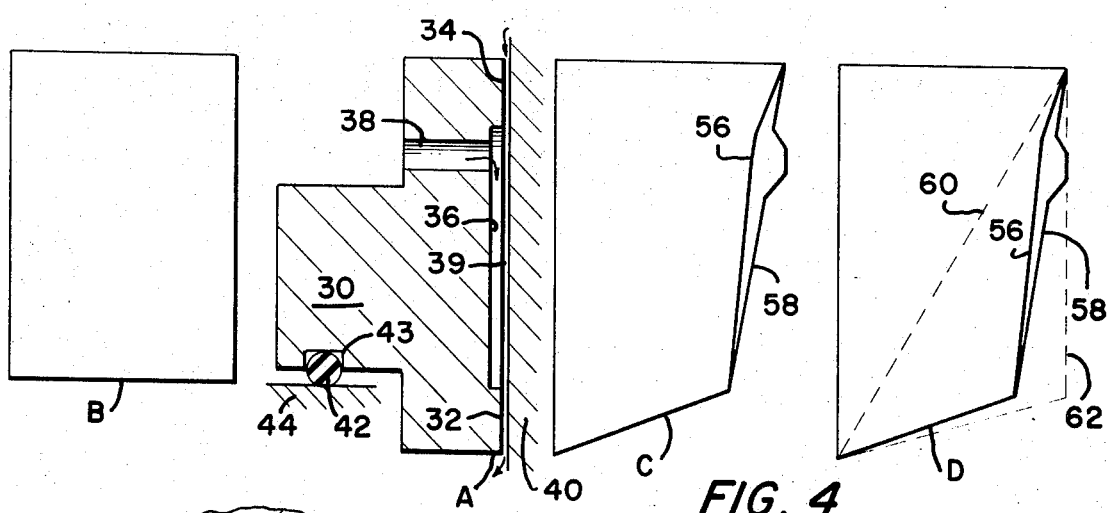
FIG. 4 is a schematic diagram useful in explaining the advantages of my new invention when used as a straight leakoff seal.

FIG. 4 is a schematic diagram showing the pressure profiles between the sealing faces useful in explaining the advantages of my new invention. The pressure profiles for equilibrium of the sealing ring are shown by B and C in FIG. 4. The pressure profiles across the sealing face are drawn as straight lines for simplicity, but are actually slightly curved lines. A represents sealing ring 30 and collar 40. B shows the pressure profile acting on the back of the sealing ring. C shows the pressure profile acting on the mating faces of the sealing ring and the collar. The area enclosed by the pressure profiles represents the force acting on the sealing ring per unit circumference. Hence, for equilibrium the enclosed area of B equals the enclosed area of a line which is an average of lines 56 and 58 plus the other lines shown in C. The restoring forces are shown by D.

Lines 56 and 58 represent the pressure profile for hydrostatic equilibrium between passageways 38 and across the passageways, respectively. Broken lines 60 and 62 are pressure profiles for extreme positions of the sealing ring. The area between the average of lines 56 and 58 and line 60 represents the maximum restoring force to prevent the seal from opening, and the area between the average of lines 56 and 58 and line 62 represents the maximum restoring force to prevent the seal from closing. Line 62 is obtained by applying an external force to the sealing ring tending to close the sealing ring. Line 60 is obtained by applying an external force to the sealing ring tending to open the sealing ring.

Passageways 38 play an important role in the performance of the seal. When the seal faces are in full contact, meaning no flow-through, the passageways will allow the pressure to enter space 39 and build up a pressure profile as shown by line 62. The generated restoring forces will separate the seal faces and restore equilibrium. Without passageways 38 the system pressure would not be able to penetrate into space 39, and the seal would remain closed. The number of passageways intersecting into the recessed area 36 of sealing ring 30 and their radial location are also significant, since they largely influence the shape of the pressure profile generated between the sealing faces. Increasing the number of the passageways will increase the running clearance. Moving the passageways radially inward will also increase the running clearnace. The reason is that for both conditions the area enclosed by the pressure profile of the front face grows larger, which upsets the equilibrium; and to restore the equilibrium, the sealing ring has to move farther away from the collar.

The diameter of each passageway 38 is much grater than any of the spacings between the sealing members. For example, a typical sealing arrangement may have passageways 38 with a diameter of 0.060 inches, a spacing between dams 32 or 34 and the collar of 0.00015 inches, and a spacing between the recessed portion of sealing ring 30 and the collar of 0.0006 inches. Thus, the recessed portion of the sealing ring is 0.00045 inches. The diameter of each passageway should be at least 50 times the recessed depth.

Figure 5:
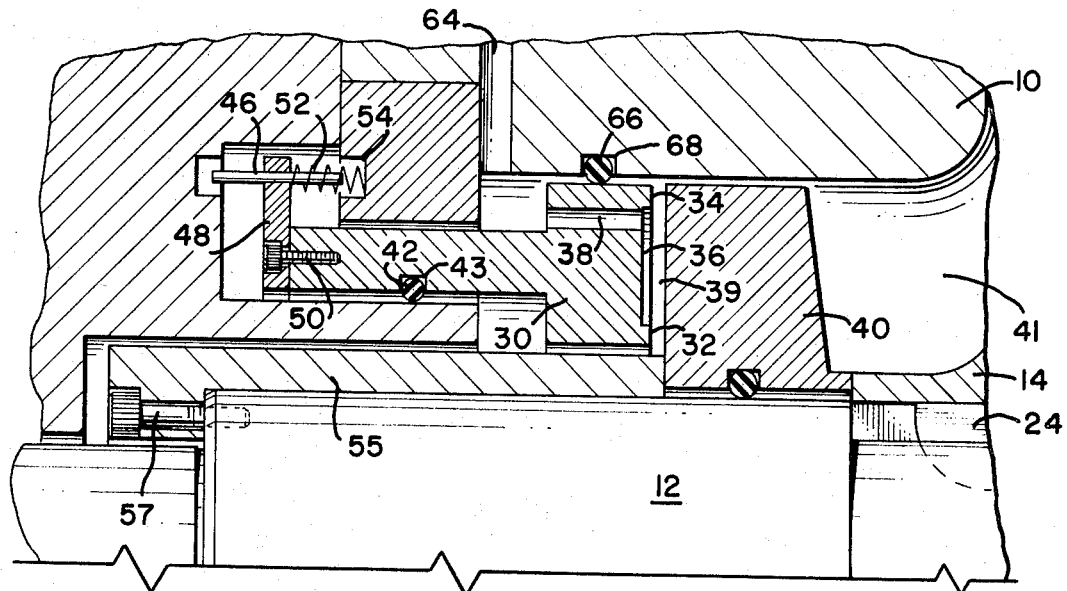
FIG. 5 is a side elevational view, partly in section, showing the use of my new invention as an injection seal.

FIG. 5 shows the use of my new seal in an injection system. For this purpose a housing inlet 64 is provided through housing 10. The injection pressure through inlet 64 is exerted on the rear face of sealing ring 30. A second secondary sealing means, such as an O-ring 66, is located within the annular groove 68. O-ring 66 is located so that the injection pressure and the external system pressure are interconnected only through passageways 38.

Figure 6:
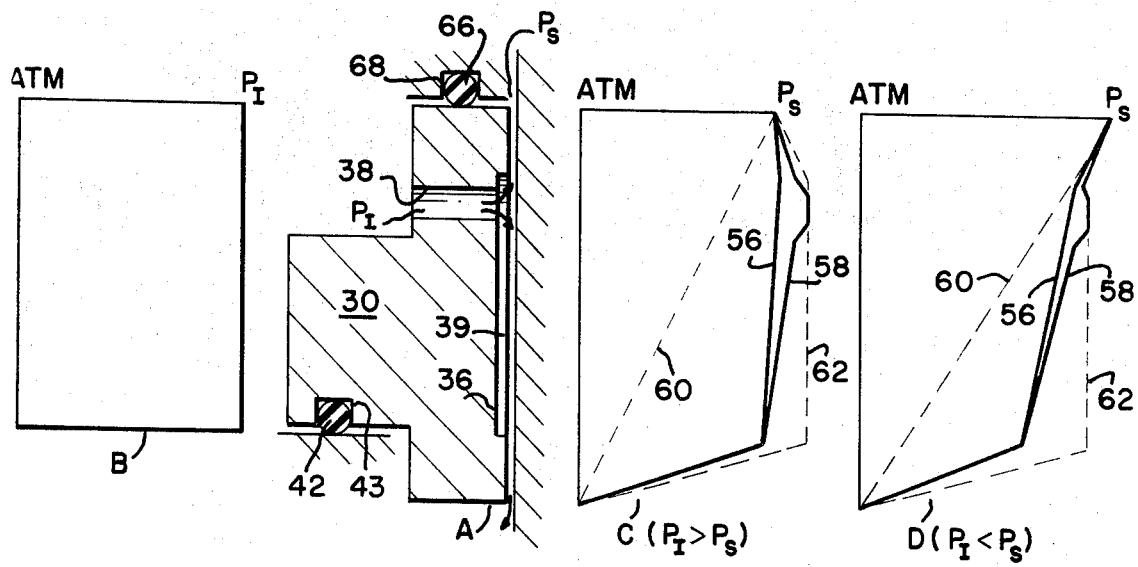
FIG. 6 is a schematic diagram useful in explaining the advantages of my new invention when used as an injection seal.

As shown in FIG. 6, the injection pressure is introduced behind sealing ring 30 and separated from the system pressure by O-ring 66. The injection medium flows through passageways 38, into the system, and out to the atmosphere. To accomplish this the injection pressure has to be sufficiently higher than the system pressure. The pressure profiles acting on the back and front face areas of the sealing ring are shown by B and C, respectively.

In the event that the system pressure is higher than the injection pressure, the system medium as well as the injection medium will flow to the atmosphere. The pressure profiles for this case are shown by B and D.

The axially movable fluid seal shown in FIGS. 1 through 7 may be used as a straight leakoff seal or an injection seal where the higher pressure is along its outer perimeter and the lower pressure is along its inner perimeter. The embodiment shown in FIG. 8 and FIG. 9 is used where the higher pressure is along the inside perimeter of the axially movable seal and the lower pressure is along the outside perimeter of the seal.

FIG. 8 is shows an axially movable annular seal 70 used as a straight leakoff seal. The system pressure from the impeller cavity flows along the outside of the seal spacer 55 and then through the spaces between annular seal 70 and collar 40 provided by inner annular dam 72, recess 74, and outer annular dam 76.

A plurality of passageways 78 axially spaced from the center of the seal 70 and circumferentially equally spaced interconnect the system pressure with the recess 74. The O-ring 80 located in the annular groove 82 is located so that the system pressure works against at least a portion of the rear face of annular seal 70. The diameter of each passageway 78 may be 0.060 inches, the spacing between collar 40 and dams 72 and 76 may be 0.00015 inches, and the spacing between collar 40 and recess 74 may be 0.0006 inches. Thus, the recessed portion of the sealing ring is 0.00045 inches. The diameter of each passageway should be at least 50 times the recessed depth.

FIG. 9 shows the use of the axially movable annular seal 70 as an injection seal. An injection fluid inlet 84 is provided in housing 10. Also, a second O-ring 86 is provided in an annular groove 88 formed on the housing annular extension 90 and located betweeen the inside perimeter of annular seal 70 and extension 90 so that the injection fluid through fluid inlet 84 is separated from the system pressure except through passageways 78. The coil springs 92 mounted about the pins 94 exert a force sufficient to just overcome the friction of the O-rings under zero pressure differential conditions.

I claim:

1. In combination with a housing containing fluid pressure and having a fluid outlet;
    a first seal member and a second seal member located along a fluid path between said fluid pressure and said outlet:
    the second seal member having a mating face opposite the first seal member and a rear face facing away from said mating face, said second seal member being adapted to be moved axially toward and away from the first seal member:
    the mating face of said second seal member having a pair of spaced dams extending across said fluid path and separated by a recessed portion extending between said dams,
    means for applying fluid pressure against at least a portion of the rear face of the second seal member;
    the shape and dimensions of the second seal member being such that there is a restricted fluid passageway between said mating face and said first seal member such that a differential pressure exists in the space between said seal members and the differential pressure acts in conjunction with the fluid pressure acting on said rear face to automatically balance and maintain the second seal member in a substantially sealing condition with the first seal member such that a slight spacing is maintained between said members; and
    means for providing seal passageways extending from the rear face of the second sael member and into said recessed portion at a point adjacent the dam being subjected to the higher pressure such that the pressure is substantially equal on opposite sides of the unrestricted passageways, the diameter of each unrestricted passageway being at least fifty times the depth of said recessed portion of the second seal member.

2. The combination of claim 1 wherein:
    the fluid applied against the rear face of the second seal member is from the same fluid source as the fluid flowing between said mating face and said first seal member.

3. The combination of claim 1 wherein:
    the means for applying fluid pressure against at least a portion of the rear face of the second seal member comprises:
    a fluid inlet adapted to permit the application of fluid pressure against said rear face and secondary sealing means separating said fluid from the fluid flowing between the mating face and the first seal member except through the unrestricted passageways.

4. The combination of claim 1 wherein:
    the first movable seal member is a collar connected to a rotatable shaft,
    and the second seal member is a sealing ring coaxial with the rotatable shaft.

5. The combination of claim 4 wherein:
    said dams are annualar protrusions adjacent the inner and outer edges of the sealing ring
    and the unrestricted fluid passageways are radially equally spaced from the axis of the sealing ring and equally spced apart circumferentially.

* * * * *